April 21, 1925.
D. A. WARD
AUTOMOBILE TIRE CHAIN
Filed Aug. 11, 1922   2 Sheets-Sheet 1
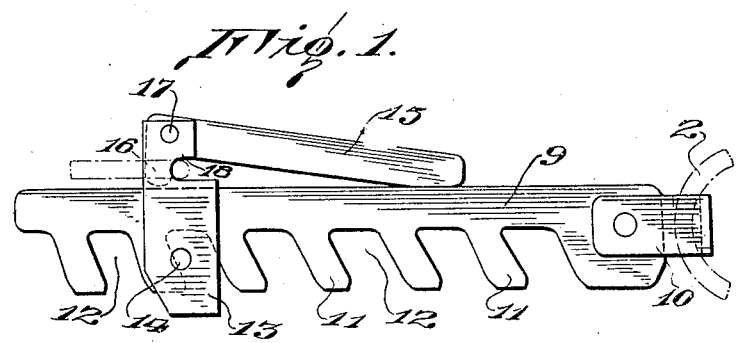
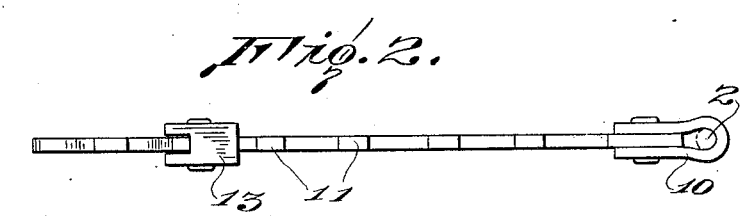
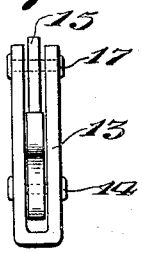
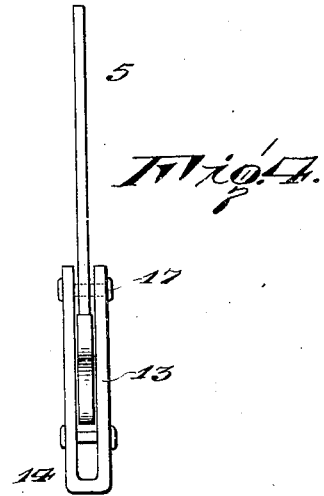
Inventor
David A. Ward
By R. Peale Herrick
Attorney Inventor
David A. Ward
By R. Peale Harick
Attorney Patented Apr. 21, 1925.

1,535,071

UNITED STATES PATENT OFFICE.

DAVID ALLEN WARD, OF PRIMROSE, NEBRASKA.

AUTOMOBILE TIRE CHAIN.

Application filed August 11, 1922. Serial No. 581,172.

*To all whom it may concern:*

Be it known that DAVID A. WARD, a citizen of the United States, residing at Primrose, in the county of Boone and State of Nebraska, has invented certain new and useful Improvements in Automobile Tire Chains, of which the following is a specification.

This invention relates to anti-skid chains and fastening means therefor.

The principal object of the invention is to provide an improved general construction of automobile tire chains.

A further object of the invention is to provide an anti-skid chain which can be constructed to suit any size tire or wheel and which will eliminate the trouble now found in anti-skid chains, wherein the cross chain due to the strain thereon pulls or breaks the links connecting same with the side chains. In my improved anti-skid chain the rings to which the cross chains are connected are free to rotate, thus distributing the strain on the rings to various parts of same and preventing any one part of each ring from wearing and finally breaking away from the side chains.

These and like objects of the invention will be better understood as the description follows and as is specifically pointed out in the appended claim.

Referring to the accompanying drawing which forms a part of this specification and which clearly illustrates the construction of the invention, Figure 1 is a side elevation of the locking or fastening means.

Figure 2 is a top plan view of same.

Figure 3 is an end elevation of same.

Figure 4 is an end view of the locking device showing same in an open or unfastened position.

Referring to the accompanying drawings in detail, like characters will be used to designate like parts in the different views.

Figure 5:
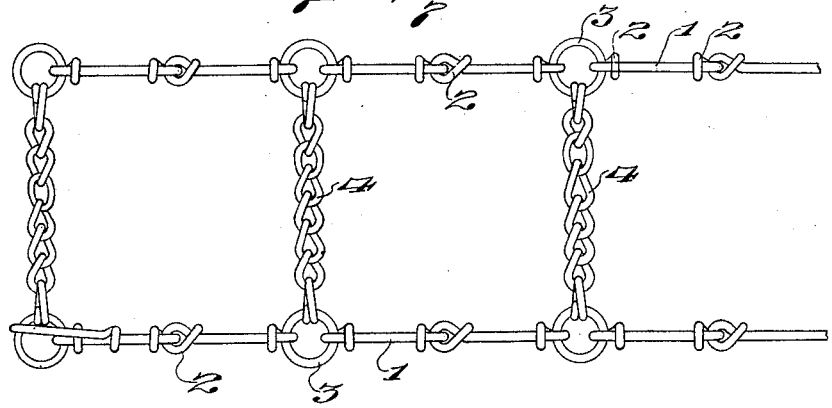
Figure 5 is a plan view of a fragmentary section of my improved anti-skid chain.
Figure 6:
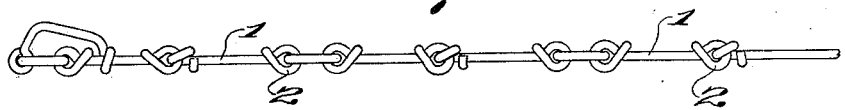
Figure 6 is a side elevation of my improved chain.

In the drawings, the numeral 1 indicates one of a series of wires which are each provided with an eye 2 at each end so that the said wires are adapted to be connected to the adjoining wires to form side chains. At spaced intervals of every two links, as has been found best from experience, a ring 3 is placed in each of the side chains to which is connected a cross chain 4. It can be readily seen that the ring 3 is free to rotate, thus preventing any one portion of the ring from becoming worn and thus equalizing the strain on the ring to all parts of same.

Figure 7:
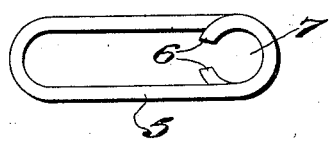
Figure 7 is a side elevation of one of the links used in the construction of my chain.
Figure 8:
Figure 8 is a side elevation of a modified form of link.

In Fig. 7 I have shown a modified form of link as indicated by the numeral 5, wherein the ends 6 are coiled about each other to form an eye at one end of the link as indicated at 7, while the bend in the opposite end of the link forms means for connecting with the adjoining link.

Figure 9:
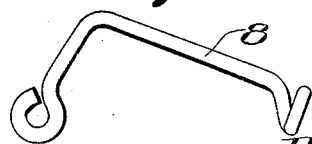
Figure 9 is a further modified form.

In Fig. 9 I have shown a further modified form of link as indicated by the numeral 8.

My improved means for fastening the chain in position on a tire or wheel, comprises a bar 9 which is connected to one of the eyes 2 of the chains 1 by means of a U-shaped clamp 10, and the bar 9 is provided with teeth or projections 11 which form pockets 12 in the bar 9. A sleeve 13 which is approximately U-shape in cross section is mounted on the bar 9 and is provided with a locking pin 14 and a lever 15 having a cam 16 is pivotally connected as at 17 between the upper ends of the U-shaped sleeve 13.

When placing my chain in position on an automobile tire, the chains are placed as is now the custom, after which the links or eyes on the free ends of the chains are passed over the handles 15 and allowed to drop down onto the sleeves 13 and engage the recesses or shoulders 18, so that when the levers 15 are pushed downwardly until the outer ends of same engage the bars 9, the locking pins 14 are moved up into engagement with the projections 11, and the free ends of the links in the anti-skid chains engage the cam shaped members 16, thus the tighter the pull is on the chains, the tighter the chains will pull against the cams 16 and force the locking pins 14 into engagement with the projections 11.

In view of the foregoing description of my invention taken in connection with the accompanying drawing, it is thought that any further explanation as to the construction and operation of my improved anti-skid chain and fastener is unnecessary.

While I have shown and described the preferred form of my invention, I realize that various minor changes may be resorted to, without departing from the spirit and scope of the invention as claimed, therefore, I do not wish to limit myself to the exact details of construction shown nor to the combination and arrangement of parts.

What I claim as new and desire to secure by Letters Patent is:—

In a traction element of the class described, a pair of side chains consisting of links having rotatable uniformly spaced rings therebetween, each link being looped at its ends to engage on one end a loop on a similar link and on the other end a rotatable ring, and a plurality of cross chains connected with said rotatable rings.

In testimony whereof I affix my signature.

DAVID ALLEN WARD.